A. F. KLINZING.
STANCHION.
APPLICATION FILED APR. 15, 1911.
1,128,332.
Patented Feb. 16, 1915.
2 SHEETS—SHEET 2.
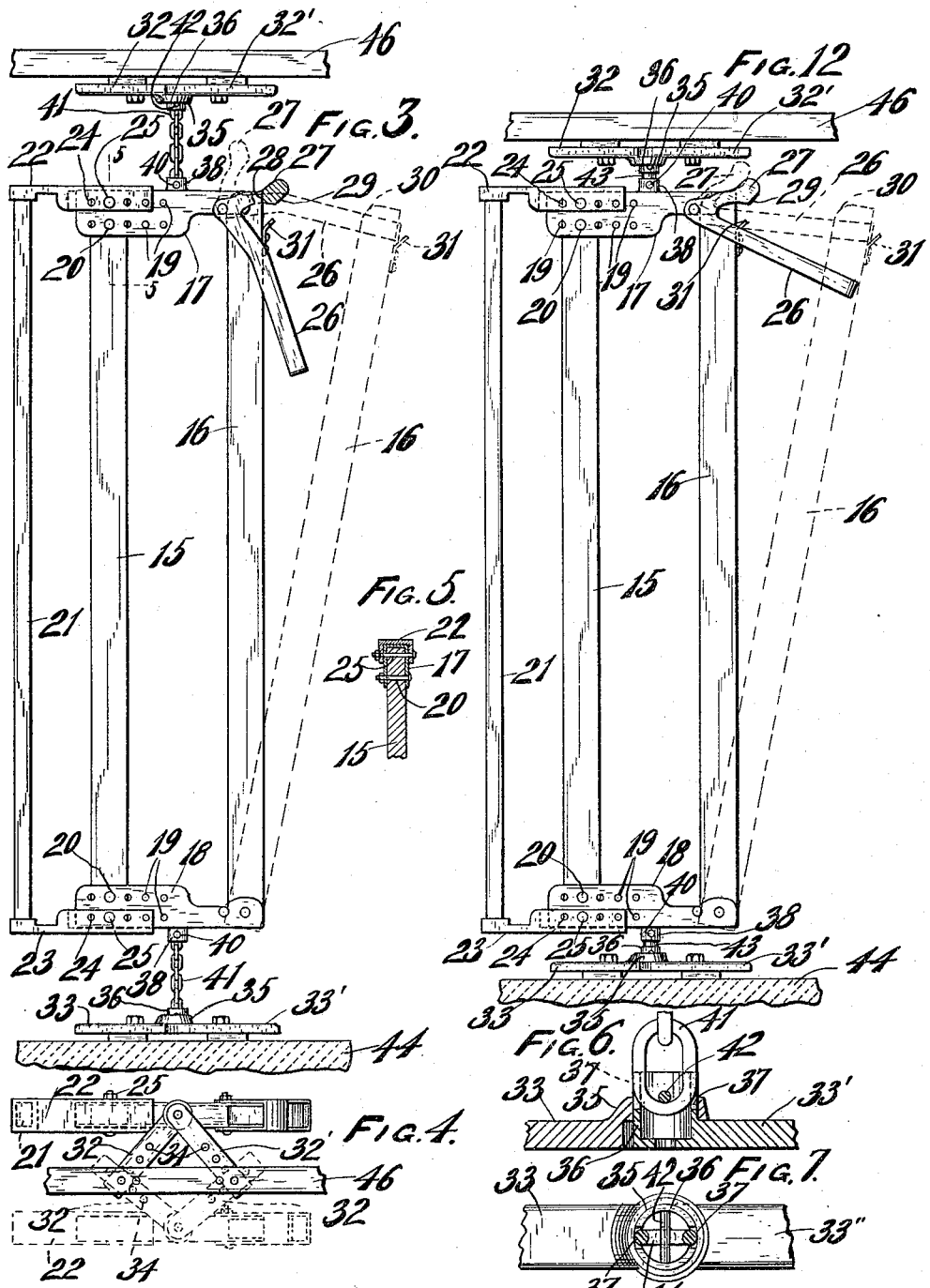

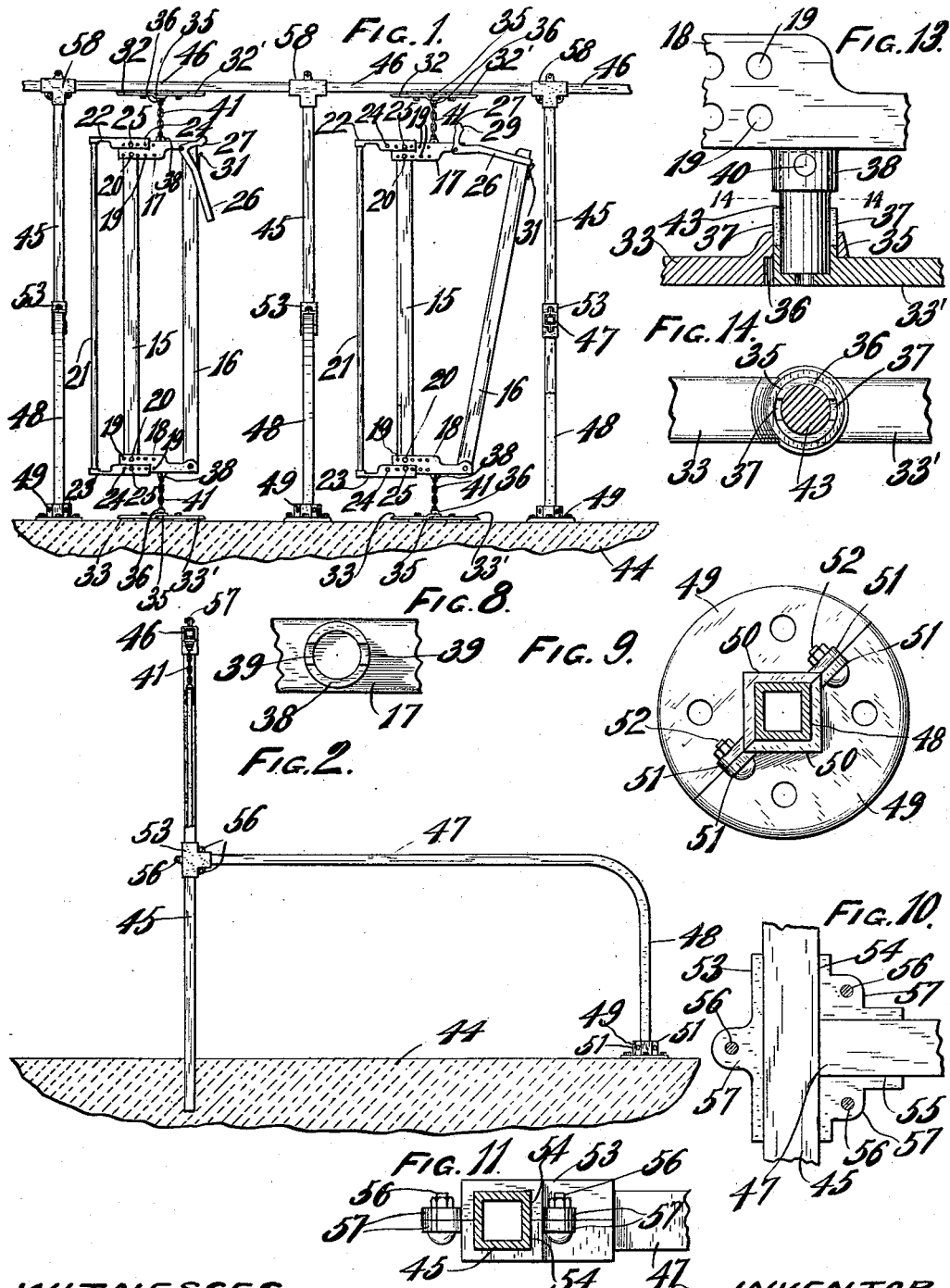

UNITED STATES PATENT OFFICE.

AUGUST F. KLINZING, OF ST. CLOUD, WISCONSIN.

STANCHION.

1,128,332.  Specification of Letters Patent.  Patented Feb. 16, 1915.

Application filed April 15, 1911. Serial No. 621,249.

*To all whom it may concern:*

Be it known that I, AUGUST F. KLINZING, a citizen of the United States, residing in St. Cloud, in the county of Fond du Lac and State of Wisconsin, have invented new and useful Improvements in Stanchions, of which the following is a description, reference being had to the accompanying drawings, which are a part of this specification.

My invention has relation to improvements in cattle stanchions.

The invention designs more particularly to provide a stanchion guard adjustably secured to the stanchion to vary the width between the stanchion and the side of the stall, so that the animal will be prevented from inserting his head between the side of the stall and the stanchion, and will have to insert his head between the stanchion bars, which may then be secured to the animal.

The invention further designs to provide a new and improved stanchion guard.

With the above, and other incidental, objects in view, the invention consists of the devices, and parts, or the equivalents thereof as hereinbefore more fully set forth.

In the accompanying drawings Figure 1 is a rear view of a double stall, each stall equipped with one of the improved stanchions, a portion of one of the stalls being broken away and sectioned, and the pivoted stanchion bar of one of the stanchions being shown in open position. Fig. 2 is a side view of one of the stalls, parts broken away and other parts in section. Fig. 3 is an enlarged side view of one of the stanchions, the pivoted stanchion bar being shown in full lines as in closed position, and in dotted lines in open position. Fig. 4 is a plan view of Fig. 3, showing in full lines the stanchion as adjusted in one direction, and in dotted lines the stanchion as adjusted in the opposite direction. Fig. 5 is a vertical section on the dotted line 5—5 of Fig. 3. Fig. 6 is a vertical sectional view of that portion of the mechanism located on the floor of the stall, and providing for the adjustment backwardly or forwardly of the stanchion, and also illustrating the means for connecting the chain. Fig. 7 is a plan view of Fig. 6, the link of the chain being shown in section. Fig. 8 is a plan view of the bearing secured to the top connecting bar of the stanchion. Fig. 9 is a plan view of one of the base plates for the stall tubes, the stall tube being shown in section. Fig. 10 is a view of one half of the connecting medium between the upright stall tube and the horizontal tube. Fig. 11 is a side view thereof, the stall tube being shown in section. Fig. 12 is a front view of a stanchion, showing a modification in the construction, wherein the chains are dispensed with and trunnions substituted. Fig. 13 is a detail view of the trunnion mechanism, the adjustable links and bearing for the trunnion being shown in section. Fig. 14 is a horizontal section of the line 14—14 of Fig. 13.

Referring to the drawings, the numeral 15 indicates one of the stanchion bars which is rigid in the top and bottom connecting bars of the stanchion, and the numeral 16 indicates the other stanchion bar which is pivotally connected at its lower end to the lower connecting bar of the stanchion. The said upper and lower connecting bars, indicated respectively by the numerals 17 and 18 are preferably of the particular construction shown, *i. e.* are U-shaped in cross section (see particularly Fig. 5), and their ends nearest to the pivoted stanchion bar are reduced. The opposite side walls of these U-shaped connecting bars are provided with two lines of registering apertures 19, and between the walls of the respective connecting bars are received the upper and lower ends of the stanchion bar 15, said ends of the stanchion bar being held between the walls by means of bolts 20 passing through any two registering openings of the innermost line of openings, and through the ends of the said stanchion bar. By changing the bolts to other alined openings, it is obvious that the position of the stanchion bar 15 can be changed so as to diminish or increase the space between it and the pivoted stanchion bar, so as to provide for this space accommodating itself to the requirements or size of different cattle.

It frequently happens that a cow upon entering a stall will thrust its head into the space between the stanchion bar 15 and the side of the stall, instead of between the two stanchion bars of the stanchion. In order to prevent this, I provide a guard consisting of a post 21, provided at its opposite ends with the horizontally extending arms 22 and 23, which are likewise U-shaped in cross section. These arms extend in a direction to embrace and receive therein the side walls of the upper and lower connecting pieces 17 and 18 of the stanchion.

These arms 22 and 23 are each provided with a single line of apertures 24, and these apertures are adapted to be brought into register with the apertures of the outer lines of apertures of the connecting bars 17 and 18, and bolts 25 are adapted to be passed through the registering or alined apertures so as to hold the guard in adjusted position. By this construction, it is obvious that by removing the bolts 25 the position of the guard can be adjusted so as to bring the post 21 at a proper intermediate position between the stanchion bar 15, and the side of the wall, and thereby render it impossible for the animal to insert its head into the space between said stanchion bar and the side of the wall. The bolts 25 act in conjunction with the bolts 20 so as to more securely retain the opposite ends of the stationary stanchion bar between the side walls of the upper and lower connecting members 17 and 18.

One of the bars of a stanchion is usually pivoted, so as to permit the bar to be swung to an open position, and thereby afford a free space for the insertion of the animal's head between the bars, and after the head is inserted the pivoted stanchion bar is then turned to its closed position so as to retain the animal's head between the bars. It is also desirable to employ in connection with the pivoted bar a means for supporting the bar in its open position, and also a means for releasably locking the said bar in its closed position. In my improved construction, I provide a novel form of holding and retaining device, of a shape approximating that of a bell-crank, so as to provide a long arm 26 and a short arm 27. The whole device is in the form of a link, that is to say, is composed of opposite side members spaced a distance apart, and connected together at their ends. The inner side wall of the connecting member at the end of the short arm 27 forms a straight shoulder 28, and this short arm on its under side, near its extremity, is provided with an inclined surface 29 which is adapted to coöperate with a rounded surface 30 at the upper end of the pivoted stanchion bar, so that when said stanchion bar is turned to a closed position, the upper rounded surface thereof will ride by the inclined surface 29, and the straight outer side of said bar will finally engage against the shoulder 28, and will be thereby held releasably in closed position. If, now, it is desired to permit the pivoted stanchion bar to assume its open position, the end of the long arm 26 of the holding and retaining device is grasped and raised. This will have the effect of turning the short arm 27 to the dotted line position shown in Figs. 3 and 12, and consequently release the shoulder 28 of said short arm from engagement with the upper end of the pivoted stanchion bar. The stanchion bar being no longer held, it necessarily swings outwardly to the dotted line position shown in Figs. 3 and 12, the extent of this outward movement or swing being limited by the transverse connecting element at the end of the long arm 26. To hold the long arm 26 up, or in other words, to prevent its dropping down upon the pivoted stanchion, when said stanchion bar is thus in its open position, I provide on the outer side of said stanchion bar a supporting catch 31.

In stanchion construction it is desirable, and quite essential, that means be provided whereby the animal may freely turn its head in either direction, and also that there may be a backward and forward adjustment of the stanchion so that the rear ends of the animals may be, as far as possible, in alinement at the rear ends of the stalls. To accomplish this in my improved construction, I connect to the under side of the upper bar of the stall two links 32—32', and to the flooring or bottom two similar links 33—33'. The links of each set are provided with a series of openings 34, adapted to receive bolts which are passed through any of the openings in the links in accordance with the adjustment desired, and in the case of the upper links enter blocks on the under side of the upper connecting bar of the stall, and in the case of the lower links enter openings in blocks secured to the floor of the stall. The links are converged, and their converging ends are connected together in the manner to be described. The links 32 and 33 of the respective sets are provided with a tubular bearing or socket 35, and the links 32' and 33' of the respective sets are also provided with sockets or bearings 36 which fit within and are surrounded by the sockets 35. The socket 36 of the lower link 33' extends upwardly quite a little distance above the upper end of socket 35, and the socket 36 of the upper link 32' extends downwardly quite a little distance below the lower end of socket 35 of the upper link 32. These sockets 36 on the upper and lower links 32' and 33' are provided at diametrically opposite points with slots 37—37.

Depending from the lower connecting bar 18 of the stanchion is a short tubular member 38, provided at diametrically its opposite points with elongated slots 39—39. Extending through this tubular member is a pin 40. This pin also extends through the upper link of a chain 41, which upper link is inserted of course into the tubular member 38. The lower link of this chain extends into the lower bearing or tubular socket 36, and a pin 42 intersects the socket, passes through the lower link, and consequently secures said lower link within the socket. It will be seen that the sides of the lower link of the chain are alined with the elongated slots 37 in the lower socket 36, and the sides of the upper link on the chain are alined with elongated slots 39 of the tubular member 38. By this means provision is made for the use of a chain having links of varying widths. For instance, a link of small width which will freely fit in the socket may be employed, but if for any reason a stronger chain, or a chain with links of a greater width is desired the slots 37 and 39 permit of the insertion of said larger links into the sockets 36 and 38, as clearly shown in Figs. 3, 6 and 7 of the drawing. The manner of connecting the opposite ends of the upper chain is exactly similar to the manner of connecting the end links of the lower chain. That is to say the apertured upper links 32—32' are converged and provided with exactly similar engaging sockets, the innermost socket being slotted at diametrically opposite points and also provided with the transverse pins 42 passing through the inner socket 36 and engaging the upper link of the chain. On the top connecting bar 17 of the stanchion is secured a short tubular member similar to the short tubular member 38 depending from the lower connecting bar and designated by the same reference numeral 38, and this upper short tubular member is also provided at diametrically opposite points with elongated slots. This short tubular member is also intersected by the transverse pin 40 which passes through the lower link of the upper chain. The two links of each set of links are provided, respectively, with the openings 34, herein before referred to, and pins are adapted to be inserted through any of the openings in these links. From this construction of upper and lower apertured links, it is obvious that if the position of the stanchion in the stall is desired to be shifted either forwardly or backwardly of the stall, all that is necessary to be done is to remove the pins which pass through the openings 34 of the converging links, and insert said pins in other openings of said links dependent upon whether it is desired to position the stanchion forwardly or backwardly of the stall. In Fig. 4 of the drawings, in full lines, the links are shown so as to position the stanchion forwardly in the stall, while in dotted lines is shown the links as reversed, so that their converging meeting and socketed ends point to the rear of the stall. This necessarily positions the stanchion at a point considerably to the rear of the stall. Where links are used provided with elongated slots, with pins or bolts passing through said slots, the bolts are apt to become loose, and the position of the stanchion will thereupon become accidentally changed when there was no desire to adjust its position. By providing the series of openings or apertures 34, however, this danger of an accidental shifting of the stanchion forwardly or backwardly of the stall is effectually overcome.

In Fig. 12 is shown a modification of the stanchion, and in Figs. 13 and 14 are details of this modification. The modification referred to consists of dispensing entirely with the upper and lower chains, and substituting therefor trunnions 43—43. This substitution can be accomplished without the necessity of changing or modifying any of the parts of the device, excepting of course the omission of the chain and the substitution therefor of the trunnions. The upper end of the upper trunnion passes into the upper tubular socket 36, and its lower end passes into the upper short tubular member 38, being held therein by means of the pin 40. The upper end of the lower trunnion passes into the lower short tubular member 38, and is held therein by means of the other pin 40, and the lower end of this trunnion passes freely into the lower socket or bearing 36. By this modified construction, it will be evident, that the stanchion is capable of being turned freely in either direction. It is not absolutely essential that the pins 40 shall extend through the tubular members 38, as it is obvious that the pins 40 could extend through the openings in the sockets or bearings 36 and effectually hold the trunnions, so that either arrangement of the pins may be adopted as desired.

I prefer to employ my improved stanchion in connection with the particular form of stall shown in the drawings. The stalls are usually mounted upon a concrete base or floor 44. My improved form of stall comprises the front upright members 45—45 having their lower ends sunk or anchored in the cement flooring, the connecting bar 46 which connects the upper ends of said front upright bar, the side bars 47, and the rear bars 48—48, which latter are preferably formed by bending downwardly the side bars, as clearly shown in the drawings. I prefer that the several bars enumerated be tubular and square in cross section. The lower ends of the rear bars 48 are received and clamped in base plates, shown in detail in Fig. 9, secured to the cement flooring and preferably each consists of two hemispherical sections 49—49. The sections at their meeting edges are provided with registering V-shaped upstanding flanges 50—50, which, when the sections are brought together, form a square socket for the reception of the lower end of the rear bar 48. These sections are also provided at their meeting straight edges with upstanding lugs 51, through which bolts 52—52 are passed, and serve to hold the sections securely together and to clamp the lower end of the rear bar in the square socket. The forward ends of the side bars 47 are secured to the upright bars 45 by means of a connecting device 53, one half of said connecting device being shown in detail in Fig. 10 of the drawings. This connecting medium consists of two matching half sections, each similar to the one half-section shown in Fig. 10. Each half section has a forward portion provided with a vertically-extending groove or recess 54, angular in cross section, and each half section is also provided with a rearwardly-extending portion provided with a horizontally-extending groove or recess 55, also angular in cross section. When the half sections are adjusted together, the registering grooves 54 of the respective sections form a vertical tubular bore through which the front upright bar 45 of the stall passes, and the registering grooves 55 of the rearwardly extending portions of the sections form a horizontal tubular bore which receives therein the forward end of a side bar 47 of the stall. The two sections of the connecting device 53 are held together by means of bolts 56 passing through registering lugs 57 of the respective sections of the devices. The upper ends of the front upright bars 45 are connected to the several top connecting bars 46 by means of ordinary T-couplings 58.

What I claim as my invention is:

1. In a stanchion, the combination of a movable stanchion comprising stanchion bars, a guard consisting of a guard member, and arms projecting from said member, said member being disposed in the space between the side of the stall and one of the stanchion bars, and adjustable connections between the projecting arms of the guard and the stanchion, the connections being so constructed that the guard is capable of an independent adjustment toward and away from one of the stanchion bars to thereby vary the width of the space between the side of the stall and said stanchion bars, and is movable with the stanchion in any of its adjusted positions.

2. In a stanchion, the combination of a movable stanchion comprising stanchion bars and upper and lower connecting bars, a guard consisting of a guard member and upper and lower arms projecting from said member, each of said arms provided with a plurality of apertures, and bolts passing through said apertures and through the upper and lower connecting bars of the stanchion, said guards being thereby movable with the stanchion, but adjustably connected therewith, so as to have an independent movement toward and away from one of the stanchion bars to thereby vary the width of the space between the side of the stall and said stanchion bar.

3. In a stanchion, the combination of a revoluble and backwardly and forwardly adjustable stanchion, comprising stanchion bars, a guard consisting of a guard member, and arms projecting from said member, said member being disposed in the space between the side of the stall and one of the stanchion bars, and an adjustable connection between the projecting arms of the guard and the stanchion, the connection being so constructed that the guard is capable of independent adjustment toward and away from one of the stanchion bars, and is revoluble and adjustable backwardly and forwardly with the stanchion in any of its adjusted positions.

4. In a stanchion, the combination of a revoluble stanchion comprising stanchion bars and upper and lower connecting bars, said bars provided with a plurality of apertures, a guard disposed in the space between the side of the stall and one of the stanchion bars, said guard comprising a guard member and arms projecting from the ends of said member, said arms being grooved to receive the upper and lower connecting bars respectively, and provided with a plurality of apertures registering with the apertures in said connecting members, and bolts passing through any of the registering apertures of the connecting members and arms to adjustably connect said guard to the stanchion, to vary the width of the space between the stanchion and the side of the stall.

5. In combination with a movable stanchion, of a guard secured to said stanchion and adjustable with respect thereto so as to vary the width of the space between the stanchion and the side of the stall.

6. In combination with a movable stanchion, of a guard detachably secured to said stanchion and adjustable with respect thereto so as to vary the width of the space between the stanchion and the side of the stall, and means for detachably securing the guard to the stanchion.

In testimony whereof, I affix my signature, in presence of two witnesses.

AUGUST F. KLINZING.

Witnesses:
JOSEPH HARR,
EDWARD BRAUN.